United States Patent [19]
Boluk et al.

[11] Patent Number: 5,968,407
[45] Date of Patent: *Oct. 19, 1999

[54] AIRCRAFT DEICING FLUID WITH IMPROVED ANTI-ICING AND ICE ADHESION CONTROL PROPERTIES

[75] Inventors: Mehmet Yaman Boluk, Montreal East, Canada; Michael Scott Jarrell, SO. Charleston, W. Va.; Barbara Jane Brymer, Newtown, Conn.; Germain Archambault, ST. Hubert, Canada

[73] Assignee: Union Carbide Chemicals & Plastics Technology Corporation, Danbury, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 07/942,400

[22] Filed: Sep. 9, 1992

[51] Int. Cl.⁶ ............................... C09K 3/18; C04B 9/02
[52] U.S. Cl. ..................... 252/70; 106/13; 106/14.05; 106/14.12; 106/14.13
[58] Field of Search .................... 252/70, 71; 106/13, 106/14.13, 14.12, 14.05

[56] References Cited

U.S. PATENT DOCUMENTS

| | | |
|---|---|---|
| 2,373,727 | 4/1945 | West et al. .................................. 106/13 |
| 3,940,356 | 2/1976 | Byrnes .................................... 260/29.6 |
| 4,358,389 | 11/1982 | Konig-Lumer et al. .................. 252/70 |
| 4,585,571 | 4/1986 | Bloom ........................................ 252/70 |
| 4,698,172 | 10/1987 | Tye et al. .................................. 252/70 |
| 4,954,279 | 9/1990 | Ma et al. .................................... 252/70 |
| 4,978,469 | 12/1990 | Seaman, Jr. . |

FOREIGN PATENT DOCUMENTS 8600919  2/1986  European Pat. Off. .

*Primary Examiner*—Necholus Ogden
*Attorney, Agent, or Firm*—G. T. Hampilos

[57] ABSTRACT

A glycol-based deicer composition having ice adhesion repression properties is provided. Ice adhesion control derives from the presence of a film of the composition which is retained on the deiced surfaces and interferes with adhesion of new ice. The composition includes one or more anionic or nonionic surfactants selected to provide a spreading wetting value of 0 to about −5 degrees per centimeter.

10 Claims, No Drawings

AIRCRAFT DEICING FLUID WITH IMPROVED ANTI-ICING AND ICE ADHESION CONTROL PROPERTIES

FIELD OF INVENTION

This invention relates to water/glycol compositions which have both deicing, anti-icing and ice adhesion control properties when applied to surfaces. More particularly, it relates to compositions which can be applied to aircraft surfaces to remove ice, snow and frost from the surfaces and remain on the surfaces to provide protection from ice, and/or snow build-up, yet be readily removed from the surfaces by the shear stresses generated during the takeoff of the aircraft. Even if, under heavy precipitation and/or during long waiting time, snow and/or ice accumulate on the aircraft, a residual film of the fluid still prevents the bonding of ice on the surface. This allows an easy and quick redeicing, using a minimum amount of deicing fluid in a minimum amount of time.

BACKGROUND OF THE INVENTION

Aircraft are subject to the buildup of ice, frost and/or snow on their surfaces while the aircraft are on the ground during cold weather in the presence of relatively high humidity, rain and/or snow. Ice and snow form strong bonds to metal surfaces. Once a strong bond is formed between ice and metal surfaces, it takes a significant period of time and a high volume of deicing fluid to melt the snow and ice and remove them from the surface. Because the buildup of ice, frost and/or snow on the aircraft surfaces can adversely affect the functioning of the aircraft, such buildups should be removed from the airplane, and aircraft surfaces must be free from contamination before takeoff.

Deicing solutions, such as those based upon ethylene glycol and water, have been used for many years to remove ice, frost and/or snow from aircraft surfaces. These deicing compositions can effectively remove the buildup of ice, frost and/or snow from the surfaces, but since they have low viscosities and have weak interfacial interactions with aircraft surfaces, they do not form a film and stay on the aircraft surfaces. Thus, they provide limited protection against the formation of further frost and ice or accumulation of snow on the surfaces. Furthermore, conventional deicing fluids do not decrease the bonding strength of ice on the metal aircraft surfaces, once the snow and/or ice build-up occurs. This makes the deicing a long and high volume deicing fluid consumption process.

Anti-icing fluids are those that will prevent the formation of frost and ice or the accumulation of snow on surfaces over extended periods of time. The use of anti-icing fluids would be particularly desirable for overnight frost protection and for use during bad weather operation to accomodate substantial delays between the time the aircraft is deiced and takeoff.

One approach to formulating anti-icing fluids is to add thickening agents to deicing fluids. The thickening agents are intended to increase the viscosity of the fluid and thereby reduce its tendency to run off the surfaces of the aircraft. A number of thickened fluids are commercially available in the world. These include Kilfrost Anti-icing Barrier Compound-3, Hoechtst A.G. Aircraft deicing Fluid 1704, and SPCA Aircraft Deicer 84, Union Carbide Corporation UCON (TM) Anti-icing Fluid E, an ethylene glycol-based fluid containing polyacrylate, Union Carbide Corporation Aircraft Deicing fluid 251, a propylene glycol-based product, which is a non-Newtonian fluid containing a crosslinked polyacrylic acid as a thickener, as well as those fluids disclosed in U.S. Pat. No. 4,954,279.

An anti-icing fluid must meet a number of criteria. One of the most important criteria is that the anti-icing fluid be easily removed from the surfaces of the aircraft during its takeoff. This ability to be released from the aircraft surfaces must exist even if no precipitation occurs after the application of the anti-icing fluid and some of the fluid evaporates. Moreover, the fluid should have special rheological properties in that it must have sufficient viscosity to be retained on the aircraft surface while the aircraft is at rest, yet require little force for it to be removed from the surface. Another important consideration in providing an anti-icing fluid is that the fluid should be capable of being applied using conventional spraying devices. Since these spraying devices can subject a thickened fluid to stress, loss of rheological properties is often experienced during the spray application of anti-icing fluids using a cross-linked polyacrylate thickener.

Another concern when using thickened fluids for anti-icing agents is the stability of the fluid during storage. For example, if an anti-icing fluid tends to gel during storage, the fluid, when applied, may be too viscous for effective removal from the aircraft or, if the gelling results in phase separation, the fluid may lose viscosity and thus not provide the desired anti-icing properties.

In addition to the foregoing requirements, good deicing and anti-icing agents should induce no appreciable erosive or corrosive activity, particularly towards aluminum, non-ferrous metals, steel, glass and acrylic sheeting. The anti-icing fluid should also be an effective deicer, resulting in rapid and complete thawing of ice, snow and frost, and it should provide a coherent liquid film after application to the aircraft surfaces, i.e., it should wet the surfaces with which it comes in contact. Most advantageously, anti-icing fluids should be environmentally acceptable, provide minimum toxicity to plants and animals, and provide little risk of flammability.

Tests using commercially available anti-icing fluids on a simulated segment of an aircraft wing indicate that anti-icing fluids can result in appreciable lift loss as compared to deicing (unthickened) fluids. Accordingly, substantial room for improvement in anti-icing fluids for aircraft exists.

U.S. Pat. No. 2,373,727, discloses compositions to prevent or reduce the formation and/or accretion of ice on aircraft surfaces. The compositions comprise a jelly base consisting of gelatinous material and glycol or glycerol or homologs thereof or polyglycols or polyglycerols, e.g., diethylene glycol or tri-ethylene glycol, and from 5 to 20 percent by weight of a liquid which is immiscible with ice or water and remains liquid at temperatures down to 10° F. The immiscible liquids are disclosed to be mineral, vegetable and animal oils, including essential oils such as petroleum lubricating oils, castor oils and pine oils, synthetic oils, the water-immiscible alcohols and similar liquids. The patentees state that it is necessary to add a dispersing agent such as alkali metal or organic-based soaps or fatty acids or oleic acid, napthanates, sulfonic acid salts, commercial soaps or monhydric alcohols. The jelly base may be prepared from any suitable material such as gelatin, glue, soap or gum which forms a heat-reversible, jelly-like mass with the glycol or glycerol.

U.S. Pat. No. 4,358,389 discloses anti-icing compositions that contain 0.05 to 1.5 percent by weight of a particular cross-linked polyacrylate, glycol, water, 0.05 to 1 percent by weight of a water-insoluble component comprising a mixed base mineral oil comprising paraffin hydrocarbons and naphthenes, 0.05 to 1 percent by weight of a surface active agent comprising alkali metal alkylaryl sulfonate, corrosion inhibitor and a quantity of at least one alkaline compound selected from the group consisting of alkali metal carbonates, bicarbonates or hydroxides and amines, such that the pH of the composition is between about 7.5 and 10. The patentees disclose at column 5, line 54, et seq., "In addition to the components . . . , the agent . . . can also contain appropriate additives, preferably anti-oxidants and polysaccharides (gums) in effective quantities (gums are additional thickeners) . . . It has been found that polysaccharides have an advantageous effect on the rheological properties of crosslinked polyacrylates, particularly those having viscosity values in the lower range of the viscosity limits indicated above, that is, within the range from about 1000 to 5000 mPas. Preferred polysaccharides are those of the type of high molecular xanthan gum."

The patentees disclose suitable corrosion inhibitors to include those belonging to the group comprising inorganic metal salts, alkali metal salts of fatty acids, monoalkyl amines and dialkyl amines optionally alkoxylated—and salts thereof, alkanol amines—optionally alkoxylated and salts thereof, esters of phosphorus acid or of phosphoric acid, and triazoles.

German Patent application 3,143,059 published May 5, 1983, discloses an anti-icing composition using a cellulose derivative thickener to provide a solution having a viscosity of 100 to 5000 mPa. sec at 20° C. The composition contains surfactant which is an alkali alkaryl sulfonate or oxyalkylated fatty alcohol, corrosion inhibitor and alkali carbonate, alkali hydroxide or amine to give a pH of 7.5 to 10. The application states that the composition may contain other thickeners, particularly polyacrylate or xanthan gum.

An anonymous disclosure in Research Disclosure, Apr. 1985, No. 25246, entitled "Aircraft Deicer," describes aircraft anti-icer concentrate to which water and/or glycol can be added. the anti-icer concentrate comprises water and an antifreeze as the two main components; up to 5 percent by weight of a thickener from the group comprising cellulosic derivatives such as alkyl, hydroxy alkyl and carboxy alkyl, ethers or mixed ethers of cellulose, cross-linked or non-crosslinked polyacrylates, xanthan gum, starch or starch derivatives and guar, it being possible for all except for the polyacrylates also to act as co-thickeners; an active amount of a tenside, optionally in combination with a water-insoluble compound, the tenside being selected from the group comprising polyalkylene glycols, polyalkyl oxalates of alcohols, carboxylic acids, amines or amides, olefin sulfonates, fatty alcohol sulfates and alkyl benzene sulfonates, and the water-insoluble compound being selected from the group comprising fatty alcohols, fatty acid esters, fatty acid alkanolamides, mineral oils, alkyl phenols and alkyl benzenes; customary corrosion inhibitors, such as, for example, carbonates, phosphates, silicates, amines, ethanolamines and benzotriazoles; and sufficient alkali that the pH value of the agent is within the desired alkaline range.

SUMMARY OF THE INVENTION

By this invention unthickened deicing fluids are provided which have excellent deicing properties. The deicing fluids of this invention also provide a useful level of anti-icing and reduction of ice adhesion on wide range of surfaces, e.g., aluminum surfaces, painted surfaces, and composites, such as are used on aircraft. Since these deicing compositions do not contain any thickener, they are low viscosity Newtonian fluids, they do not require high speed takeoff, thus can be advantageously used on commuter and general aviation types of aircraft in addition to jet aircraft. Further, since these fluids are not thickened, they do not require special nozzles and pumping equipment for application. More specifically, the present invention provides a deicer composition having improved anti-icing and ice adhesion reduction or repression properties, comprising from about 25% to about 95% by weight, based on the weight of the total composition, of glycol selected from the group consisting of ethylene glycol, diethylene glycol, triethylene glycol, polyethylene glycol, propylene glycol, dipropylene glycol, glycerol and mixtures thereof; a pH-adjusting agent in an amount sufficient to provide a pH of 7 to about 10; and at least one nonionic or anionic surfactant, or mixtures thereof, in an amount sufficient to cause the composition to have a contact angle $\theta$ on aluminum of 0° to about 35° and a surface tension $\delta$ of about 15 to about 40 dynes per centimeter, to provide a spreading wetting value w of 0 to about −5 dynes per centimeter in the equation $w=\delta(\cos\theta -1)$; optionally, a corrosion inhibitor; the remainder of the composition being water.

The invention further provides a process for improved ice adhesion repression on aircraft surfaces, comprising applying to such surfaces, by conventional techniques, a composition of this invention, and allowing such composition to coat such surfaces by the action of spreading wetting, thereby providing on such surfaces a thin film of the composition to which ice does not adhere, or adheres only weakly relative to fluids which provide only poor to no ice adhesion repression. Accordingly, there is also provided a process whereby any subsequent build-up of ice can be more easily removed by further deicing using a substantially lesser quantity of deicing fluid than that needed for the initial deicing.

DETAILED DESCRIPTION OF THE INVENTION

As indicated above, an essential characteristic of a deicing fluid for aircraft is its ability to be removed from aircraft surfaces, particularly wing surfaces, by forces generated during takeoff. In order to obtain a useful level of anti-icing performance, however, it is necessary for the fluid to be retained on such aircraft surfaces during taxi and while being subjected to adverse weather conditions while waiting for takeoff clearance. The deicing fluid of this invention combines the easy removability of a typical deicing fluid while yet providing a commercially useful level of anti-icing performance. The anti-icing performance comes from the excellent spreading wetting and characteristic film formation of the fluid. Because of the optimized spreading wetting characteristics of the present compositions, a residual film, on the order of a few microns in thickness, is deposited and retained on the aircraft surfaces. Although ice can thereafter form over such film, the ice will not adhere to the aircraft surfaces or will adhere only weakly, and thus will be much more easily removed in subsequent deicing. Thus, deicing under prolonged bad weather conditions is greatly facilitated. This combination of advantages is achieved, without use of a thickener, by selecting one or more surfactants having functional properties which impart to the fluid composition a desired balance of contact angle $\theta$ and surface tension $\delta$ so as to satisfy the equation:

$$w=\delta(\cos\theta-1)$$

which describes the phenomenon known as "spreading wetting" (w) (see, e.g., "Surfactants and Interfacial Phenomena," Sec. Ed., John Wiley & Sons (1989).

In this equation, θ is 0 to about 35°, preferably 0 to about 25°, more preferably 0 to about 20°. The useful range for δ is about 15 to about 40 dynes/cm, preferably about 20 to about 40, and more preferably about 20 to about 35 dynes/cm. The desired result for w, obtained by solving the equation, is in the range of 0 to about −5, preferably 0 to about −4, more preferably 0 to about −3, dynes/cm. Deicing fluids meeting these criteria will have the necessary spreading wetting properties.

The glycols useful in the compositions of this invention include those heretofore suggested for deicing, representative of which are ethylene glycol, diethylene glycol, triethylene glycol, polyethylene glycols having a molecular weight in the range of about 62 to about 150, preferably about 62 to about 106, propylene glycol (1,2-propanediol and 1,3-propanediol), dipropylene glycol, glycerol, and mixtures thereof. See, for instance, U.S. Pat. Nos. 2,373,727; 3,940,389 and 4,358,389.

The glycols are typically present in the amount of about 25 to about 95%, preferably 45 to about 80%, by weight of the total composition. Where ethylene glycol and diethylene glycol are used together, it is preferred that they be present in a weight ratio to each other of about 3:1 to about 1:1, respectively.

The second key ingredient in the composition, the surfactant, may be any material capable of satisfying the above equation. Among the useful anionic surfactants, there may be mentioned linear alkylaryl sulfonates such as Siponate A-2466, Siponate DS and Siponate DDB-40 from Rhone-Poulenc Surfactant & Speciality Division. Of these, sodium alpha-olefin $C_{14}$–$C_{16}$ sulfonates are preferred.

Among the useful nonionic surfactants, there may be mentioned ethoxylated secondary alcohols. Preferred are the polyethylene glycol ethers of molecular weight of about 250 to about 650, more preferably about 300 to about 600.

It will also be appreciated by those skilled in the art that mixtures of surfactants may also be advantageously used. The criterion for selecting mixtures is to reduce the contact angle θ without decreasing surface tension δ below about 30 dynes/cm.

The deicing and anti-icing compositions of this invention should have a pH of between 7 and about 10, with a preferred range between 7 and about 9. The desired pH can be obtained using inorganic bases such as sodium hydroxide and potassium hydroxide, or amines such as triethanol amine, diethanol amine or monoethanol amine. Buffers can be included in the composition. Defoamers may also be employed. Any commercially available defoamer or antifoamer can be used, but particularly preferred defoamers are a silicone defoamer of Union Carbide Corporation sold under the trademark SAG, and FOAMBAN™ defoamer available from Ultra Additives Inc., Patterson, N.J. The amount of defoamer to be used is preferably in the range of from about 0.05% to about 0.5% by weight based on the weight of the total composition.

The composition can optionally contain at least one non-polar oil, such as aliphatic and aromatic oils such as mineral oil, paraffin oil, silicone oil, and propylene oxide/ethylene oxide copolymers. The amount of such oils is frequently in the range of from about 0.01% to about 5% by weight based on the total weight of the composition. The preferred range is between 0.1% to 1.0% by weight based on the total weight of the composition.

An optional, although highly preferred, additional component of the composition is a corrosion inhibitor. Suitable corrosion inhibitors are known to the art, and typically comprise mixtures of various functional materials, e.g., buffers, chelating agents, and the like, esters of inorganic acids such as the phosphorus and boron, aromatic triazoles such as tolyl- and benzyltriazole, and the like, in one or more solvents. A particularly preferred anticorrosion mixture is that product sold by Sandoz under the designation "Sandocorin 8132".

The selection of functional additives such as defoamers, oils, corrosion inhibitors, and the like, is not narrowly critical, and selection thereof should be within the skill of the art. However, functional additives should not be used which have a significant undesirable effect on the spreading wetting property of the composition.

The anti-icing property of the invention can be measured by the use of the procedure described below. Anti-icing and Deicing Defrosting Fluid corresponding to MIL-A-8243D (Type II) will be used as a reference material because of its wide acceptance by the industry. Under the set condition of −5° C. and at a precipitation rate of 5.0 gm/dm²/hr., the reference material was measured to have 0 minutes of anti-icing time. This test procedure is described in AEA Material Specifications of De/Anti-icing Fluid For Aircraft, G6807, Appendix A, which is incorporated herein by reference. (This test is called the Water Spray Endurance Test (WSET)).

During the test, both the reference materials and compositions of the present invention were applied to the surfaces of separate aluminum panels (30 cm by 10 cm in size and positioned at a 10° angle to horizontal), cooled to −5° C. A mist of freezing water was then sprayed onto the surfaces until frost occurred in both cases. The times elapsed were recorded. The first 25 mm section of the panel treated with reference material was completely frosted immediately. The invented formulations have protection time in the Water Spray Endurance Test from about 3 minutes to about 9 minutes.

The following examples of deicing and anti-icing compositions of the present invention are set forth for purposes of illustrations, but are in no way intended to limit the scope of the invention.

EXAMPLES

Example I

The following admixture was prepared:

| | | |
|---|---|---|
| (a) | 82.0% | ethylene glycol |
| (b) | 9.0% | diethylene glycol |
| (c) | 2.0% | sodium alpha-olefin $C_{14}$, $C_{16}$ sulfonate |
| (d) | 0.20% | Silicon anti-foamer (SAG 7133) |
| (e) | 0.85% | Anti-corrosion agent (Sandoz, Sandocorin 8132B) |
| (f) | 0.07% | KOH (50% solution) |
| (g) | 0.60% | Triethylamine (TEA) (98%) |
| (h) | 5.28% | Water |

This formulation was tested for WSET, and for ice adhesion repression. In the latter test, sample plates from the WSET test are evaluated for difficulty of removal of any ice build-up. Such ice is prodded gently with a blade and finger pressure, and a subjective evaluation is made as to whether the ice adheres strongly (little or no ice adhesion repression), or breaks up easily and comes off the surface readily (excellent ice adhesion repression). It is a principal advantage of the present formulations that they form a thin film on the aircraft surface, as previously mentioned, which provides a barrier to which ice does not adhere or adheres only weakly. Accordingly, if weather conditions cause a further ice build-up on top of the film, such ice can be much more easily and efficiently removed by a supplementary deicing treatment.

Using the AEA test procedure identified above, this composition was determined to have a WSET of 9 minutes, and had excellent ice adhesion repression.

Example II

The following admixture was prepared and tested as described above:

| | | |
|---|---|---|
| (a) | 45.0% | ethylene glycol |
| (b) | 1.0% | sodium alpha-olefin $C_{14}$, $C_{16}$ sulfonate |
| (c) | 0.20% | tolytriazole |
| (d) | 0.30% | potassium hydroxide (50% soln.) |
| (e) | 53.50% | water |

The WSET value was determined to be 7 minutes. Ice adhesion repression was excellent, i.e., ice which formed on the coated surfaces was readily broken up and removed.

Example III

The following admixture was prepared and tested as described above:

| | | |
|---|---|---|
| (a) | 54% | ethylene glycol |
| (b) | 0.30% | ethoxylated trimethylnonanol |
| (c) | 0.20% | tolytriazole |
| (d) | 0.07% | KOH (50% solution) |
| (e) | 0.60% | TEA (98%) |
| (f) | 44.83% | water |

The WSET was found to be 5 minutes, and ice adhesion repression was excellent.

Example IV

The following admixture was prepared and tested as described above:

| | | |
|---|---|---|
| (a) | 41% | ethylene glycol |
| (b) | 4.5% | diethylene glycol |
| (c) | 0.40% | tolytriazole |
| (d) | 0.20% | silicon anti-foamer |
| (e) | 0.035% | potassium hydroxide |
| (f) | 0.30% | triethanolamine |
| (g) | 0.4% | sodium arylalkyl sulfonate |
| (h) | 53.165% | Water |

Physical properties and test results are reported in Table I, below.

Example V

The following admixture was prepared and tested as described above:

| | | |
|---|---|---|
| (a) | 92% | ethylene glycol |
| (b) | 0.2% | Tergitol TMN-10 (a polyethylene glycol ether from Union Carbide) |
| (c) | 0.2% | Tergitol 2X (an ethylene oxide/propylene oxide alkoxylate from Union Carbide) |
| (d) | 0.06% | KOH (50% soln.) |
| (e) | 0.40% | Sandocorin 8132C |
| (f) | 7.14% | water |

Physical properties and test results are reported in Table I, below.

Example VI

The formulation of Example V was diluted 1:1 by weight with water. Physical properties and test results of the resulting formulation are reported in Table I, below.

Table I shows physical properties and performance results for various formulations described above. For comparison purposes, Table I also reports properties and results for a typical commercial preformulated deicing fluid, UCAR ADF-D, available from Union Carbide, and for a well-known military specification deicing fluid. Although not indicated in Table I, both the UCAR ADF-D and the Mil Spec fluid resulted in little or no ice adhesion repression, whereas the fluids of Examples 4–6 provided excellent ice adhesion repression.

TABLE I

| FORMULATION | CONTACT ANGLE, ° | SURFACE TENSION (dyne/cm) | w (dyne/cm) | WSET (minutes) |
|---|---|---|---|---|
| UCAR ® ADF-D | 31 | 45 | −6.4 | 0 |
| MIL-A-8243D, Type II | 35 | 37 | −6.7 | 0 |
| Example 4 | 19 | 35 | −1.9 | 7 |
| Example 5 | 15 | 37 | −1.3 | 6 |
| Example 6 | 6 | 34 | −0.2 | 7 |

We claim:

1. A deicer composition having improved anti-icing properties consisting of from about 25% to about 95% by weight based on the weight of the total composition of glycol selected from the group consisting of ethylene glycol, diethylene glycol, triethylene glycol, polyethylene glycol, propylene glycol, dipropylene glycol, glycerol, and mixtures thereof; a pH-adjusting agent in an amount sufficient to provide a pH of 7 to about 10; and at least one nonionic or anionic surfactant, or mixtures thereof, in an amount sufficient to cause the composition to have a contact angle $\theta$ on aluminum of 0 to about 35° and a surface tension $\delta$ of about 15 to about 40 dynes per centimeter, to provide a spreading wetting value w of 0 to about −5 dynes per centimeter in the equation $w=\delta(\cos\theta-1)$; optionally, a corrosion inhibitor; the remainder of the composition being water.

2. A composition of claim 1 wherein the glycol is selected from the group consisting of ethylene glycol, diethylene glycol, and mixtures thereof.

3. A composition of claim 2 wherein ethylene glycol and diethylene glycol are present in a weight ratio to each other of about 3:1 to about 1:1, respectively.

4. A composition of claim 1 wherein the surfactant is nonionic.

5. A composition of claim 1 wherein the surfactant is anionic.

6. A composition of claim 1 wherein the surfactant is a mixture of anionic and nonionic surfactants.

7. A composition of claim 4 wherein the surfactant is selected from the group consisting of polyethylene glycol ethers of molecular weight of about 250 to about 650, or mixtures thereof.

8. A composition of claim 1 wherein the corrosion inhibitor comprises a composition comprising a phosphate ester, an aromatic triazole and a chelating agent.

9. A process for providing ice adhesion repression on aircraft surfaces, comprising applying to such surfaces a composition of claim 1, and allowing such composition to coat such surfaces by the action of spreading wetting, thereby providing on such surfaces a thin film of such composition to which ice does not adhere or adheres only weakly.

10. A process for deicing aircraft surfaces comprising applying to such surfaces a composition of claim 1, and subsequently providing an additional deicing using a substantially lesser quantity of deicing fluid than that needed for the initial deicing.

* * * * *